Nov. 26, 1963   F. J. SCHRAMEL   3,112,368
TELECOMMUNICATION SYSTEM COMPRISING TRANSFLUXORS
Filed Aug. 18, 1958   6 Sheets-Sheet 1

INVENTOR
FRANZ JOSEF SCHRAMEL
BY
AGENT

Nov. 26, 1963  F. J. SCHRAMEL  3,112,368
TELECOMMUNICATION SYSTEM COMPRISING TRANSFLUXORS
Filed Aug. 18, 1958  6 Sheets-Sheet 4

INVENTOR
FRANZ JOSEF SCHRAMEL
BY
AGENT

Nov. 26, 1963  F. J. SCHRAMEL  3,112,368
TELECOMMUNICATION SYSTEM COMPRISING TRANSFLUXORS
Filed Aug. 18, 1958  6 Sheets-Sheet 5

INVENTOR
FRANZ JOSEF SCHRAMEL
AGENT

United States Patent Office 3,112,368
Patented Nov. 26, 1963

3,112,368
TELECOMMUNICATION SYSTEM COMPRISING TRANSFLUXORS
Franz Josef Schramel, Hilversum, Netherlands, assignor to North American Philips Company, Inc., New York, N.Y., a corporation of Delaware
Filed Aug. 18, 1958, Ser. No. 755,630
Claims priority, application Netherlands Aug. 16, 1957
9 Claims. (Cl. 179—15)

This invention relates to telecommunication systems comprising transmitters and receivers, in which the information is transmitted through a line in the form of a series of pulses.

An object of the invention is to provide means of establishing a connection between an arbitrary transmitter and an arbitrary receiver, arranged at another place, in a reliable and rapid manner.

According to the invention, each transmitter and each receiver is connected to controlled windings of a plurality of transfluxors so that between each transmitter and each receiver, arranged at another place, there is at least one signal path which extends via a plurality of transfluxors, the system having a control member which is connected to control windings of all transfluxors, and which permits of opening and closing the transfluxors included in a path from an arbitrary transmitter to an arbitrary receiver arranged at another place, the assembly being so designed that the pulses of the pulse signals to be led through this path cause the transfluxors included in it to be alternately switched from the condition B into the condition C and from the condition C into the condition B. It will be explained more fully hereinafter what is meant by the "condition B" and the "condition C" of a transfluxor.

In order that the invention may be readily carried into effect, it will now be explained more fully, by way of example, with reference to the accompanying drawings, in which:

FIGURES 1 to 5 serve to explain the operation of the transfluxor.

Figure 1:
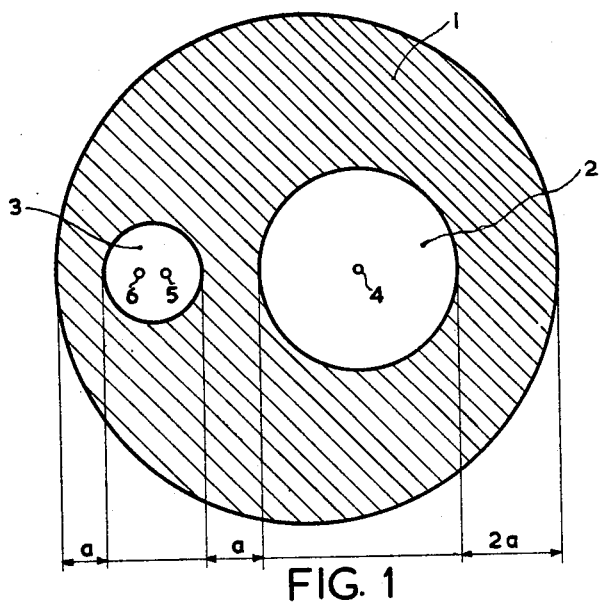

The transfluxor, disclosed in the article "The Transfluxor" by J. A. Rajchman and A. W. Lo, Proc. I.R.E., 44 (March, 1956), pages 321–332, is a cylindrical body 1 (FIG. 1) having two holes 2 and 3, parallel to the axis of the cylinder, of which the one, 2, has a diameter considerably larger than that of the other, 3. Furthermore, the sum of the thicknesses of the material on each side of the small hole 3 is approximately equal to the thickness of the material between the large hole 2 and the wall of the transfluxor. The transfluxor is made of a material having magnetic remanence and a magnetisation curve, at least approximately rectangular, for example of a ferrite. A wire 4, extending through the large hole 2, is called a control winding, the positive sense of which is, for example, directed towards the observer. Through the small hole 3 there are passed two wires 5 and 6, which are called the input winding and the output winding, respectively. Of these wires also, the sense towards the observer is called the positive.

Assume that a positive current pulse is passed through the control winding 4. If this current pulse is sufficiently strong (that is to say has a sufficiently great amplitude and lasts sufficiently long), the material of the transfluxor is magnetised in the positive sense (in the counter-clockwise direction), resulting in the state shown in idealized form in FIG. 2. Two magnetic induction tubes 7 and 8 have been formed, which are closed in themselves and which are magnetized in the positive sense. The induction tube 7 is bounded by the wall 9 of the large hole 2 and the cylindrical surface 10, co-axial therewith, which externally touches the wall 13 of the small hole 3. The induction tube 8 is bounded by the outer wall 12 of the transfluxor and the cylindrical surface 11, co-axial therewith, to which the wall 13 of the small hole 3 touches internally.

Figure 2:
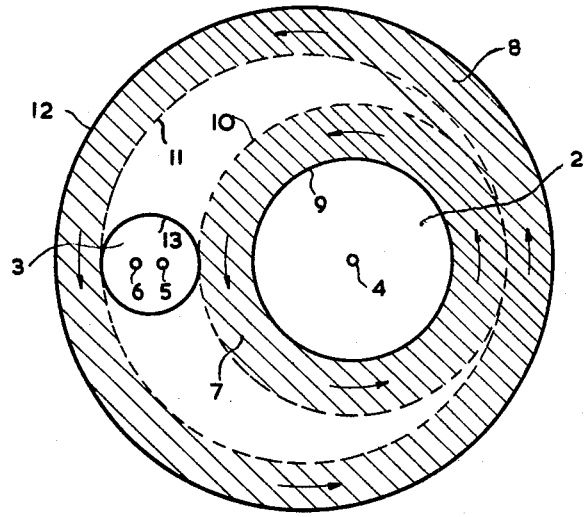

If the transfluxor is in this condition of magnetisation, a positive or negative current pulse through the input winding, which is not unduly great, cannot bring about any appreciable variation in the condition of magnetisation of the transfluxor, since a magnetic vector line (H-line) extending round the small hole, but not extending round the large hole, always has a portion in which the magnetic vector H and the magnetic induction B have the same sense. However, the magnetic induction B already has its maximum value, so that a new induction tube cannot be formed round the small hole 3. Since div B=0, the magnetic induction tubes must always be closed in themselves. However, this means that, in this condition of the transfluxor, a positive or negative current pulse applied to the input winding 5 does not induce a voltage pulse in the output winding 6 or at least induces a very small voltage pulse in it. In view thereof, the state shown in FIG. 2 is called the closed state of the transfluxor.

Figure 3:
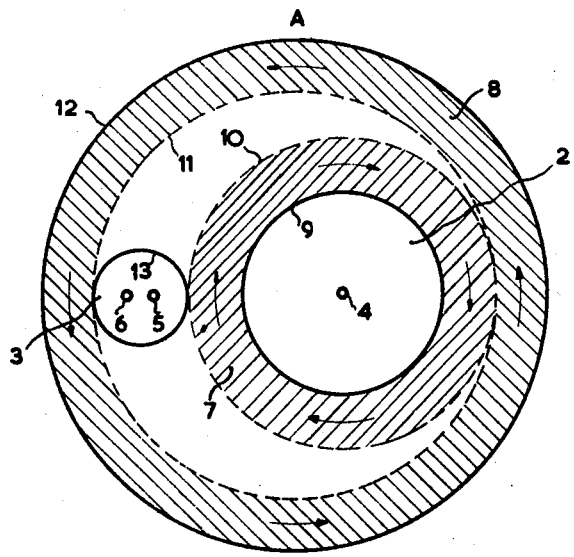

If, after the transfluxor has first been brought into the closed condition, a negative current pulse of determined strength is applied to the control winding 4, the transfluxor may be brought into the condition shown in idealized form in FIG. 3. In this condition, which hereinafter will be referred to as the state A, the two induction tubes 7 and 8 are magnetized in opposite senses.

If the transfluxor is in the state A (FIG. 3), a positive current pulse through the input winding 5, which is not unduly great, cannot bring about any appreciable variation in the state of magnetisation, since a magnetic vector line extending round the small hole, but not extending round the large hole, then has two portions in which the magnetic vector H has the same sense as the magnetic induction B, which latter already has its maximum value. For the reasons previously expalined, a new induction tube thus cannot be formed round the small hole 3.

Figure 4:
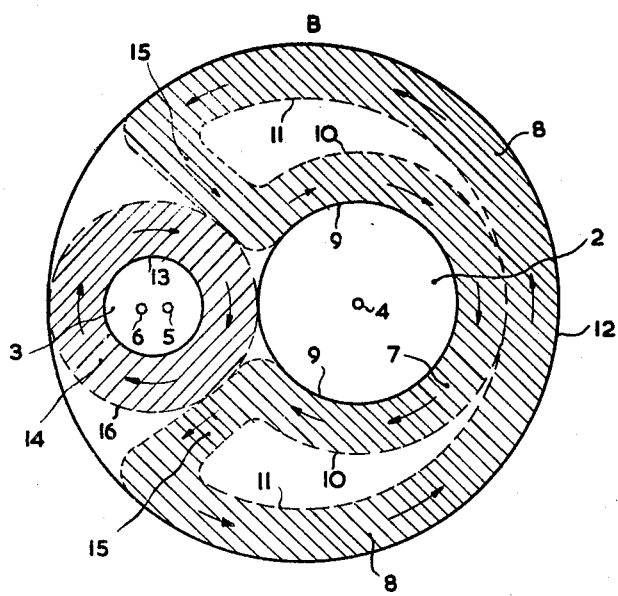

However, if a negative current pulse of determined strength is passed through the input winding 5, the transfluxor is brought into the state shown in idealized form in FIG. 4, a positive voltage pulse being induced in the output winding 6. The state shown in FIG. 4 is referred to as the state B.

Figure 5:
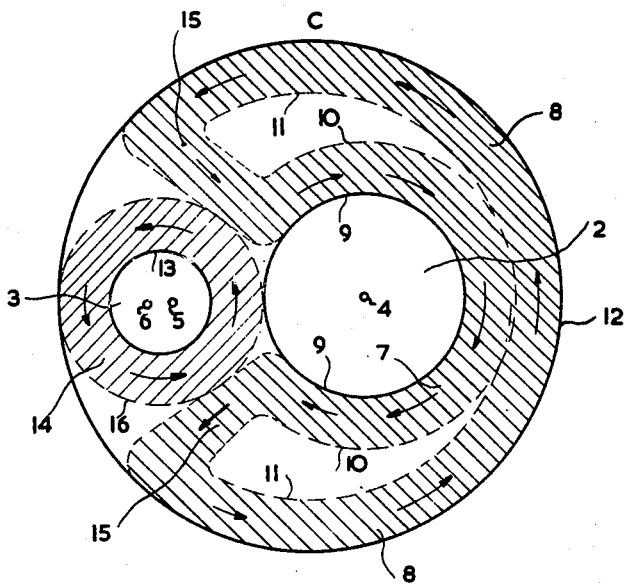

If, subsequently, again a positive current pulse of given size is passed through the input winding 5, the magnetisation of the zone 14 is reversed without any further variation in the state of magnetisation of the transfluxor. Then the transfluxor comes into the state shown in FIG. 5, which will be referred to as the state C. A negative voltage pulse is then induced in the output winding 6.

If, after the transfluxor has been brought into the open state A, positive and negative current pulses of given size are alternately passed through the input winding 5, the transfluxor successively passes through the states A, B, C, B, C, B, C . . . , negative voltage pulses during the passages B→C being induced in the output winding 6 and positive voltage pulses during the passages A→B and C→B.

It will be evident that the performance of the transfluxor as explained above is considerably idealized, but sufficiently to obtain an insight in the operation of the transfluxor. The strength of the control pulses and input current pulses are actually even less critical than could be expected from the foregoing considerations.

The transfluxor is quite serviceable as a controllable gate which passes or intercepts a series of alternately positive and negative pulses, according as it has been brought into the open or the closed state by the preceding control pulse. More particularly a transfluxor can pass or intercept a series of alternately positive and negative current pulses which are modulated in position.

For controlling the transfluxors of a transfluxor matrix, it is possible to utilize the principle of twofold or multifold coincidence known from the theory of matrix storages built up of annular magnetic cores.

A transfluxor may thus comprise two or more control windings and also two or more input windings and two or more output windings. To simplify the wording of the claims, the input and output windings, i.e. the windings extending through the small hole of the transfluxor, are referred to by the collective name "controlled windings." This is also practical in view of the fact that one and the same winding extending through the small hole of a transfluxor may serve as an input winding an output winding and hence may fulfill, for example, alternately the one function and the other.

Figure 6:
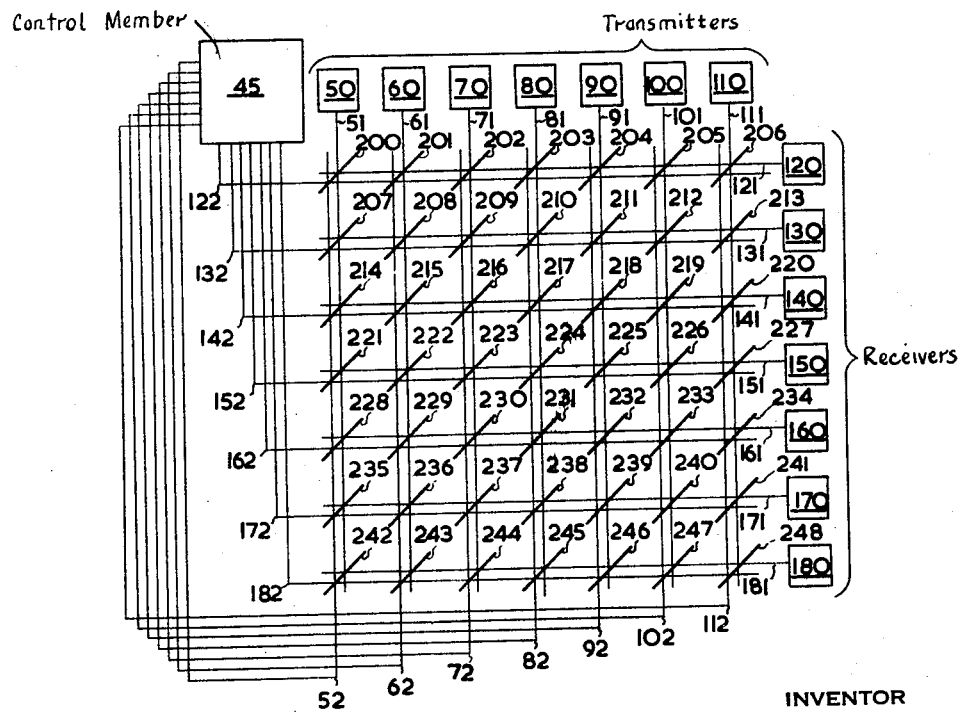
FIG. 6 shows the diagram of a telegraph exchange comprising seven transmitters and seven receivers.

FIG. 6 shows diagrammatically the principal structure of a telegraph exchange comprising seven Morse transmitters and seven Morse receivers, in which each transmitter may be connected to a receiver via a transfluxor of a transfluxor matrix. In this figure, the reference numerals 50, 60, 70, 80, 90, 100, 110 indicate the transmitters, 120, 130, 140, 150, 160, 170, 180 indicate the receivers, 200, 201 . . . 248 indicate the forty-nine transfluxors of a transfluxor matrix and 45 indicates a control member. Each transmitter is connected, via a conductor, to the series-connected input windings of the seven transfluxors of a column of the transfluxor matrix: the transmitter 50 being connected, via a conductor 51, to the series-connected input windings of the transfluxors 200, 207, 214, 221, 228, 235, 242; the transmitter 60 being connected, via a conductor 61, to the series-connected input windings of the transfluxors 201, 208, 215, 222, 229, 236, 243, etc. Each receiver is connected, via a conductor, to the series-connected output windings of a row of the transfluxor matrix; the receiver 120 being connected, via conductor 121, to the series-connected output windings of the transfluxors 200, 201, 202, 203, 204, 205, 206; the receiver 130 being connected, via a conductor 131, to the series-connected output windings of the transfluxors 207, 208, 209, 210, 211, 212, 213, etc. Finally, the telegraph exchange has a central control device 45, which may be operated automatically or manually and which is connected via conductors 122, 132, 142, 152, 162, 172, 182 to the series-connected first control windings of the rows of the transfluxors of the transfluxor matrix and connected, via conductors 52, 62, 72, 82, 92, 102, 112, to the series-connected second control windings of the columns of the transfluxors of the transfluxor matrix. For purposes of clarity, the drawing does not show the electrical return paths for the series-connected windings which are connected to the transmitters, receivers and control device. These electrical return paths are provided via extra conductors, or electrical ground or via voltage supply sources, or by any other suitable means. If, for example, the transmitter 60 wants to transmit a telegram to the receiver 150, the central control device 45 passes current pulses having an amplitude $\frac{1}{2}i$ through the conductors 62 and 152, so that the transfluxor 222 is opened, but the states of the other transfluxors are left unvaried, provided $i$ has a value such that a current pulse having the amplitude $i$ through a control winding of a transfluxor can bring this transfluxor from the closed state into the open state, whereas a current pulse having the amplitude $\frac{1}{2}i$ is incapable of doing so. It will be evident that, instead of the above-described twofold coincidence, it is also possible to utilize three-fold or morefold coincidence for controlling the transfluxors.

Figure 7:
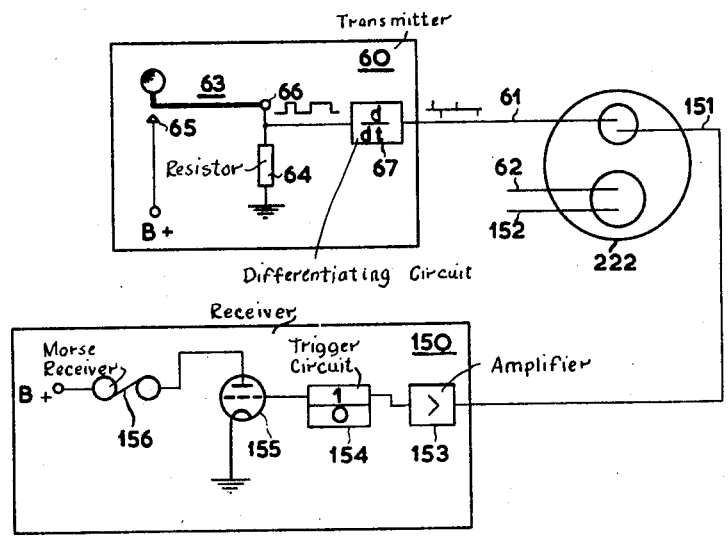
FIG. 7 shows in greater detail the signal path between a receiver and a transmitter of the exchange shown in FIG. 6.

FIG. 7 shows in greater detail a possible embodiment of the signal path from the transmitter 60 to the receiver 150. The transmitter has a sending key 63, one terminal 65 of which is connected to the positive pole B+ of a direct-current source and the other terminal 66 of which is connected to earth via a resistor 64. The block signal produced across resistor 64 is differentiated in a differentiating circuit 67, resulting in a series of pulses consisting of alternately positive and negative pulses, which, if desired after amplification, are applied via conductor 61 to the input winding of transfluxor 222. Each positive pulse of the series of pulses corresponds to a front flank and each negative pulse corresponds to a rear flank of the block signal provided by the sending key.

The receiver 150 includes an amplifier 153, a bistable trigger circuit 154, a triode 155 and a Morse receiver 156.

The series of pulses produced in the output winding of transfluxor 222 is led, via amplifier 153, to the 1-input terminal of trigger circuit 154. The latter must be so designed that it always jumps into the 1-position upon receipt of a positive pulse at the 1-input terminal and always jumps into the 0-position upon receipt of a negative pulse at the 1-input terminal. Furthermore, the trigger circuit must provide a high voltage if it is in the 1-position, and a low voltage if it is in the 0-position. The trigger circuit then again produces the initial block signal. This signal is led, via the triode 155, to the Morse receiver 156. The assembly is designed so that the anode current of the triode is nil, if the trigger circuit 154 is in the 0-position, but sufficiently great to excite the relay of the Morse receiver, if the trigger circuit 154 is in the 1-position.

Figure 8:
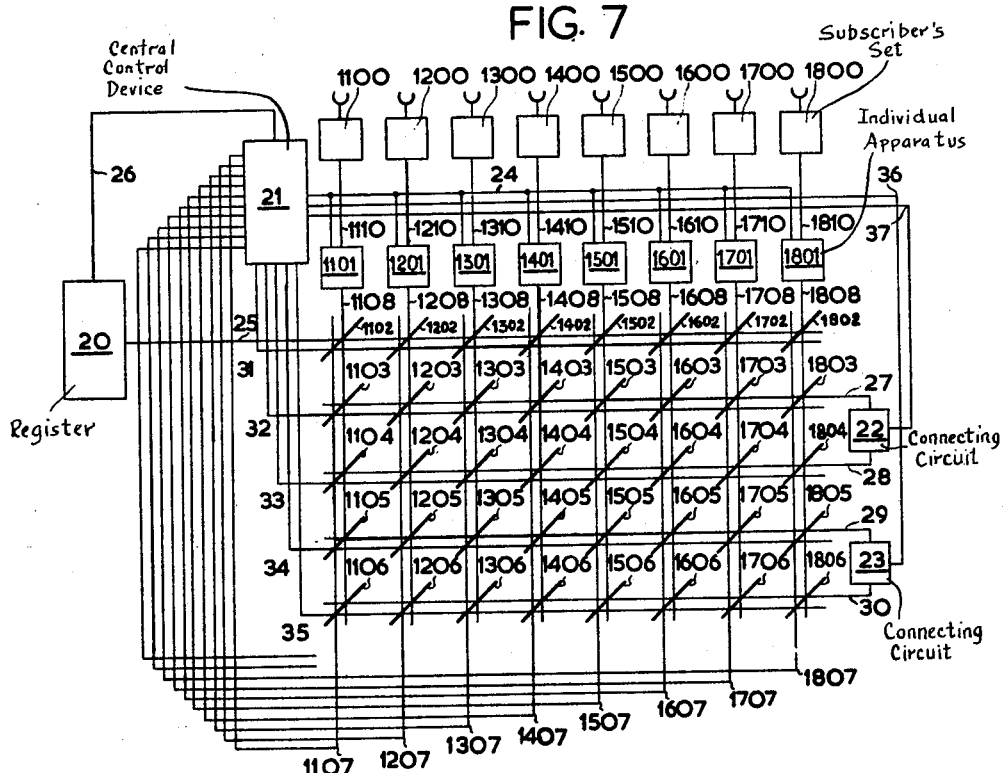
FIG. 8 shows the diagram of a telephone exchange comprising eight subscribers' sets.

FIG. 8 shows diagrammatically the fundamental structure of an electronic telephone exchange comprising 8 subscribers' sets, in which the telephone channels each extend through two transfluxors. In this figure, the subscribers' sets are indicated by the numerals 1100, 1200 . . . 1800. These members of the exchange which do not relate to a determined subscriber and hence are common to all subscribers are indicated by numbers in the interval 20–49. The members individually associated with the subscriber 1100 are indicated by numbers in the interval 1100–1199, the members individually associated with the subscriber 1200 are indicated by numbers in the interval 1200–1299, etc. Each subscriber's set is connected via two conductors (indicated by a single line in FIG. 8), to an individual apparatus and two further conductors (likewise represented by a single line in FIG. 8) to series-connected first input windings of five transfluxors of a transfluxor matrix, these five transfluxors together constituting a column of the transfluxor matrix. Thus, the subscribers' set 1100 is connected, via the conductors 1110, the individual apparatus 1101 and the conductors 1108, to the series-connected first input windings and first output windings of the five transfluxors 1102, 1103, 1104, 1105 and 1106, the subscribers' set 1200 is connected, via the conductors 1210, the individual apparatus 1201 and the conductors 1208, to the series-connected first input windings and first output windings of the five transfluxors 1202, 1203, 1204, 1205, 1206, etc. Series-connected second output windings of the transfluxors 1102, 1202 . . . 1802 (which together constitute a row of the transfluxor matrix), are connected, via common conductor 25, to a register 20, which itself is connected, via a cable 26, to a central control device 21. Series-connected second output windings and series-connected second input windings of the transfluxors 1103, 1203 . . . 1803 are connected, via two common conductors 27 (represented by a single line in FIG. 8) to one end of a connecting circuit 22, whilst series-connected second output windings and series-connected second input windings of the transfluxors 1104, 1204 . . . 1804 are connected, via two common conductors 28, to the other end of the connecting circuit 22. Similarly, series-connected second output windings and series-connected second input windings of the transfluxors 1105, 1205 . . . 1805 are connected, via two common conductors 29, to one end of a second connecting circuit 23 and series-connected second output windings and series-connected second input windings of the transfluxors 1106, 1206 . . . 1806 are connected, via two common conductors 30, to the other end of the second connecting circuit 23. The central control device 21 is connected via common conductors 31, 32, 33, 34, 35 to series-connected first control windings of the rows of transfluxors of the transfluxor matrix, the conductor 31 being connected to first control windings of the transfluxors 1102, 1202 . . . 1802; the conductor 32 being connected to first control windings of the transfluxors 1103, 1203 . . . 1803, etc. The central control device 21 is also connected, via individual conductors 1107, 1207 . . . 1807, to series-connected second control windings of the five transfluxors associated with the same subscriber: the conductor 1107 being connected to second control windings of the transfluxors 1102, 1103, 1104, 1105, 1106, the conductor 1207 being connected to second control windings of the transfluxors 1202, 1203, 1204, 1205, 1206, etc. Finally, the connecting circuits 22 and 23 are connected, via conductors 36 and 37, to the central control device 21 and the individual apparatus 1101, 1201 . . . 1801 are connected, via conductors of a cable 24, to the central control device 21.

The principle of the operation of this exchange is the following: Assuming that subscriber 1200 lifts his receiver with the intention to make a connection with subscriber 1500. As soon as subscriber 1200 has lifted his receiver, the central control device 21 receives, via the individual apparatus 1201 and a conductor of cable 24, a signal indicating that subscriber 1200 wishes communication. The central control device 21 then tests, via a conductor of cable 26, whether the register 20 is free. As soon as such is the case, the central control device passes negative control pulses having the amplitude ½i through the common conductor 31 and the individual conductor 1207, so that the transfluxor 1202 is opened in accordance with the coincidence principle. At the same time, the subscriber receives the calling tone to indicate the fact that he can select the number of the desired subscriber 1500. This number is informed to the register 20 via the common conductor 25. As soon as the register has the complete information about both the calling and the called subscriber, it transfers this information to the central control device 21, which then passes positive current pulses having the amplitude ½i through the conductors 31 and 1207, so that the transfluxor 1202 is closed and the register 20 comes free. The central control device also tested, via the conductors 36 and 37, whether one of the connecting circuits 22 and 23 is free and, via a conductor of cable 24, whether subscribers' set 1500 is free. If subscribers' set 1500 is busy or if the two connecting circuits 22 and 23 are each busy, subscriber 1200 receives the busy tone from the control member and the central control device 21 comes free. Subscriber 1200 then must replace his receiver, whereupon the initial condition is restored.

If subscriber 1500 is free and a connecting circuit is also free, for example the connecting circuit 22, the central control device 21 first passes a negative current pulse having the amplitude ½i through each of the two wires 32 and 1207, so that the transfluxor 1203 is opened, and then through each of the two wires 33 and 1507, so that the transfluxor 1504 is also opened. The subscribers' set 1200 is then connected to the subscribers' set 1500 via the conductors 1210, individual apparatus 1201, conductors 1208, transfluxor 1203, conductors 27, connecting circuit 22, conductors 28, transfluxor 1504, conductors 1508, individual apparatus 1501, and conductors 1510. The central control device 21 comes free after this connection has been established. A calling signal is now led via the connecting circuit 22 to subscribers' set 1500, but as soon as this subscriber lifts his receiver, this calling signal discontinues and the subscribers 1200 and 1500 can talk with each other.

When subscriber 1200, after his call is over, replaces his receiver, the central control device 21 passes positive current pulses having the amplitude ½i through the conductors 32 and 1207, so that the transfluxor 1203 is closed. Approximately the same thing happens as soon as subscriber 1500 has replaced his receiver. The exchange has then returned to its initial condition, insofar these two subscribers are concerned.

Figure 9:
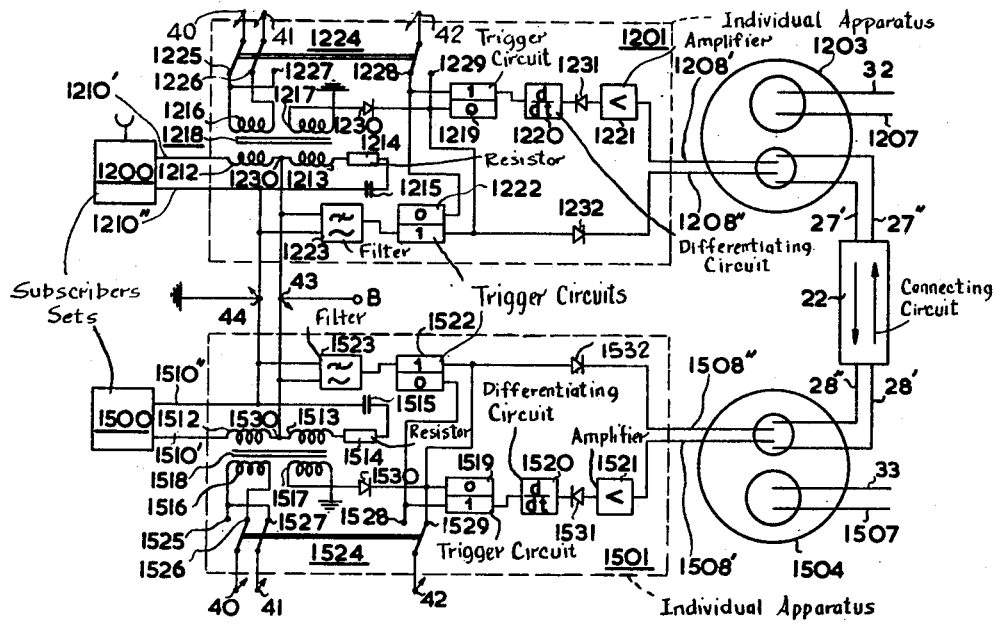
FIG. 9 shows in greater detail the telephone channel between two subscribers' sets of the exchange of FIG. 8.

FIG. 9 shows the details of a possible embodiment of the telephone channel between the subscribers 1200 and 1500.

The subscribers' set 1200 is connected by means of two conductors 1210′ and 1210″ to the individual apparatus 1201. The conductor 1210′ is connected to one end of two parts 1212 and 1213, connected in series, of a first primary winding of a transformer 1218 and the conductor 1210″ is connected, via a capacitor 1215 and a resistor 1214, to the other end of said primary winding. The capacitor 1215 and the resistor 1214 serve to make the subscribers' loop symmetrical. Furthermore, the conductor 1210″ is connected to a common earthing point 44, the junction 1230 of the two parts 1212, 1213 of the primary winding of transformer 1218 being connected to a common point 43, which itself is connected to the negative terminal B— of a direct-current source, the positive terminal of which is connected to earth.

The transformer 1218 also comprises a second primary winding 1216, one end of which is connected to fixed contacts 1225 and 1227 and the other end of which is connected to a fixed contact 1226 of a commutator 1224.

Finally, the transformer 1218 comprises a secondary winding 1217, one end of which is connected to earth and the other end of which is connected, via a diode 1230, the forward direction of which is directed from the winding 1217 away, to the 0-input terminal of a bistable trigger circuit 1219. The 1-output terminal of the trigger circuit 1219 is connected via a differentiating circuit 1220, a diode 1231 the forward direction of which is directed towards the differentiating circuit, an amplifier 1221 and a conductor 1208′ to the first input winding of transfluxor 1203.

The individual apparatus 1201 also comprises a second bistable trigger circuit 1222, of which the 0-input terminal, together with the 1-input terminal of the trigger circuit 1219, is connected to the fixed contact 1228 of commutator 1224, and of which the 1-input terminal, together with the 0-input terminal of the trigger circuit 1219, is connected to the fixed contact 1229 of commutator 1224. The 1-input terminal of trigger circuit 1222 is also connected, via a diode 1232 the forward direction of which is directed from the trigger circuit 1222 away, and a conductor 1208" to the first output winding of transfluxor 1203.

The 1-output terminal of trigger circuit 1222 is connected to an input terminal of a low-pass filter 1223. One output terminal of this filter is connected to the common earthing point 44 and its other end is connected to the junction 1230 of the two parts 1212, 1213 of the first primary winding of transformer 1218.

The commutator 1224, which is shown as a mechanical commutator in FIG. 6 for the sake of clarity, comprises three commutating arms connected to three common points 40, 41, 42 of the exchange. The commutator has two positions and is designed so that in one position the fixed contacts 1225, 1226 and 1228 are connected to the input contacts 40, 41, 42 and in the other position the fixed contacts 1226, 1227, 1229 are connected thereto.

The transfluxor has a second ouput winding and a second input winding, which are connected via conductors 27' and 27" to the connecting circuit 22.

The individual apparatus 1501 is similar to the individual apparatus 1201. The conductors 2508' and 2508" are connected to a first input winding and a first output winding of transfluxor 1504. The second output winding and the second input winding of transfluxor 1504 are connected by means of conductors 28' and 28" to the connecting circuit 22, the control windings being connected, via the conductors 32, 33, 1207, 1507, to the central control device 21.

The bistable trigger circuits must be designed so that they jump into the 1-state and remain therein if a positive pulse is led to the 1-input terminal or a negative pulse is led to the 0-input terminal and that the opposite applies to the 0-state. The 1-output terminal provides a positive output voltage if the trigger circuit is in the 1-state, and an output voltage 0 if the trigger circuit is in the 0-state.

If a telephone channel is built up between the subscribers 1200 and 1500, the transfluxors 1203 and 1504 are opened and the commutators 1224 and 1524 have been placed in opposite positions by the central control device, as shown in FIG. 6.

Figure 10:
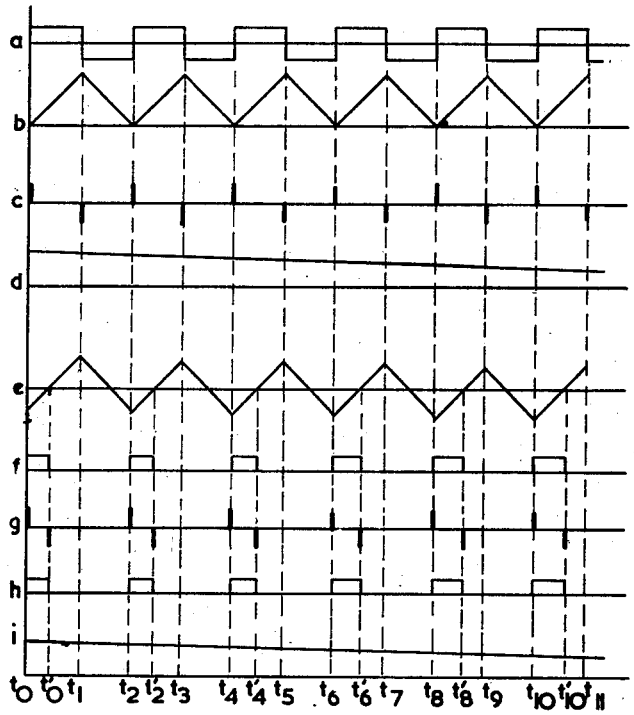
FIGURES 10 and 11 are two explanatory diagrams.
Figure 11:
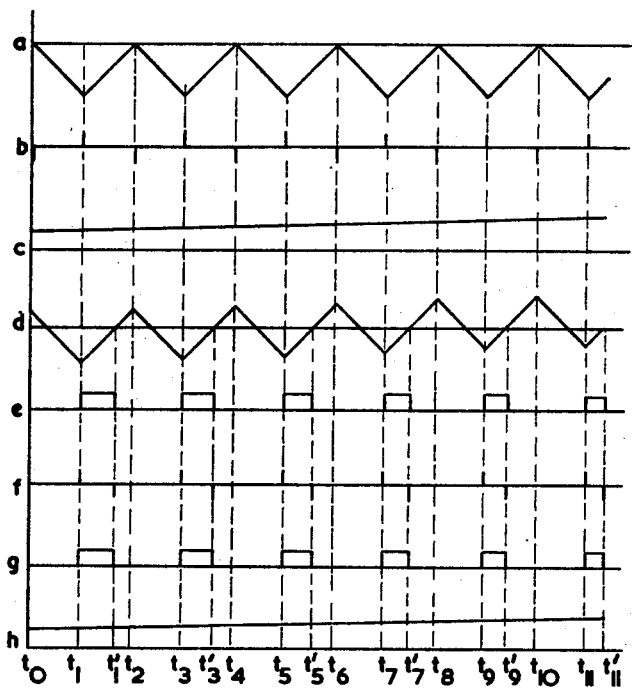

The exchange comprises a block generator (not shown) which produces a rectangular signal $10a$ (FIG. 10). A triangular signal $10b$ and a pulsatory signal $10c$ are derived therefrom by integration and differentiation. The triangular signal $10b$ is led to the common terminals 40, 41 and the pulsatory signal $10c$ is led to the common terminal 42. However, the fact that the commutators 1224 and 1524 occupy different positions, means, that the individual apparatus 1201 and 1501 receive opposite signals, so that they may be assumed that the individual apparatus 1201 receives the signals $10b$ and $10c$ (FIG. 10) and the individual apparatus 1501 receives the opposite signals $11a$ and $11b$ (FIG. 11).

Suppose that the apparatus 1201 receives from the subscribers' set 1200 a telephone signal $10d$, which slowly varies with respect to the recurrence frequency of pulsatory signal $10c$. In the transformer 1218, this signal is superimposed on the triangular signal $10b$, resulting in a signal $10e$. Consequently, the trigger circuit 1219 jumps from the 0-position into the 1-position at the moments $t_0, t_2, t_4, t_6 \ldots$ (FIG. 10), since it then receives a positive pulse from pulsatory signal $10c$ via the terminal 42 and the fixed contact 1228 of commutator 1224, and jumps from the 1-position into the 0-position at the moments $t'_0, t'_2, t'_4, t'_6 \ldots$, since the signal $10e$ becomes positive at these moments. The negative pulses of the pulsatory signal $10c$ remain without effect, since the trigger circuit 1219 already occupies the 0-position at the moments $t_1, t_3, t_5, t_9 \ldots$ when these pulses occur. The negative parts of the signal $10e$ remain without effect, since they are intercepted by the diode 1230. The trigger circuit 1219 thus provides a series of pulses $10f$ which are modulated in duration. This series of pulses is differentiated in differentiating circuit 1220, resulting in a series of pulses $10g$, the negative pulses of which are modulated in position and applied via diode 1231, amplifier 1221 and conductor 1208' to the first input winding of transfluxor 1203. The positive pulses of the series of pulses $10g$ are intercepted by the diode 1231. Consequently, pulses are led via the conductors 27' and 28" to the second input winding of transfluxor 1504, which pulses are led as negative pulses via conductor 1508" and a diode 1532 to the 1-input terminal of the trigger circuit 1522 of the individual apparatus 1501. The latter had been set in the 1-position at the moment $t_0$ by the positive pulse then supplied to it via the common terminal 42 and the fixed contact 1529 of commutator 1524. At the moment $t'_0$, this trigger circuit is set back into the 0-position by the negative pulse led to it via diode 1532, resulting in a series of pulses $10h$ modulated in duration, which is a reproduction of the series of pulses $10f$ modulated in duration. This series of pulses is demodulated in low-pass filter 1523, so that the low-frequency signal $10i$ is reproduced. The positive pulses occurring at the moments $t_0, t_2, t_4 \ldots$ bring the trigger circuits 1219, 1522 into the 1-position, as it should be, but do not affect the trigger circuits 1519 and 1222, since they already occupy the 0-position. The negative pulses occurring at the moments $t_1, t_3, t_5 \ldots$ do not affect the trigger circuits 1219 and 1522, since they already occupy the 0-position, but bring the trigger circuits 1519 and 1522 into the 1-position, as it should be.

Figure 12:
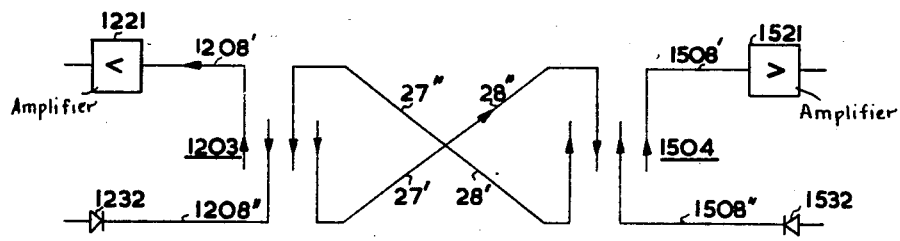
FIGURES 12 and 13 show two diagrams explaining the performance of the two transfluxors included in the telephone channel.

FIG. 12 shows the manner in which the conductors 27', 27", 28', 28", 1208', 1208", 1508', 1508" are connected to the controlled windings of the transfluxors 1203 and 1504. Included in the connecting circuits 22 between the conductors 27' and 28" on the one hand and the conductors 28' and 27" on the other is a circuit, for example a transistor circuit (not shown), which converts a positive voltage pulse in the conductors 27' and 28' respectively, into a positive current pulse (=directed from the circuit away) in the conductors 28" and 27", respectively, but which intercepts a negative voltage pulse in the conductors 27' and 28", respectively, and neither passes a pulse from the conductor 28" to the conductor 27' and from the conductor 27" to the conductor 28'. FIG. 12 shows the voltage and current pulses occurring in the controlled windings of the transfluxors 1203 and 1504 at a moment when the amplifier 1221 leads a negative current pulse via conductor 1208' to the first input winding of transfluxor 1203. The positive voltage pulse thus occurring in the conductor 1208" connected to the first output winding of transfluxor 1203 is intercepted by diode 1232. The voltage pulse induced in the second output winding of transfluxor 1203 is led, via conductor 27', to the circuit included in the connecting circuit 22, converted therein into a current pulse and led as a positive current pulse, via conductor 28", to the second input winding of transfluxor 1504. The voltage pulse thus induced in the first output winding of said transfluxor is led as a negative voltage pulse, via conductor 1508" and diode 1532, to the receiving portion of the individual apparatus 1501. The positive voltage pulse which occurs in the conductor 1508', connected to the first input winding of transfluxor 1504, is intercepted by the amplifier 1521, since the latter, similarly as amplifier 1221, must be designed so that it passes pulses in one direction only. The negative voltage pulse produced in the conductor 27", connected to the second input winding of transfluxor 1203, is intercepted in the circuit between the conductors 27" and 28' included in the connecting circuit 22 and the same happens with the negative voltage pulse induced in the conductor 28' connected to the second output winding of transfluxor 1504.

If the individual apparatus 1501 of the subscribers' set 1500 receives a low-frequency signal $11c$ (FIG. 11), it is transferred to the individual apparatus 1201 and modulated therein in exactly the same manner, but the corresponding phenomena now take place during time intervals ½T later, if T is the period of the block signal 10a or the pulsatory signal 10b. This is made clear in FIGS. 11 and 13.

Figure 13:
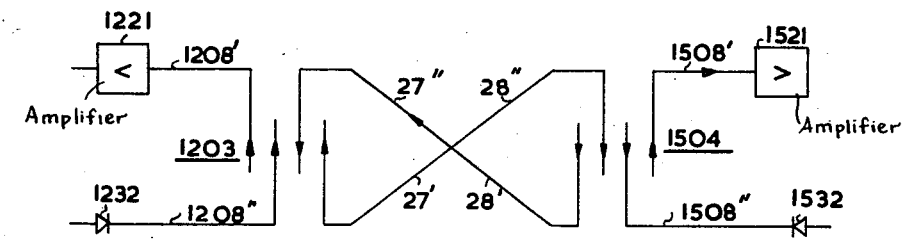

The final result is that the transfluxors 1203 and 1504 alternately transmit a pulse from the individual apparatus 1201 to the individual apparatus 1501, and conversely, the current pulses led to said transfluxors having opposite polarities during the transmission in one direction and the other, as may appear from a comparison of FIGS. 12 and 13. The two transfluxors thus continuously jump from condition B (FIG. 4) into condition C (FIG. 5), and conversely, which is a condition sine qua non for the transmission.

The operation, function and control of a transfluxor matrix has great similarity with the so-called crossbar switch, see, for example, U.S. Patent No. 1,953,503.

More particularly the technique of switching networks built up from crossbar switches may for a great part also be applied, with small modifications, to switching networks built up from transfluxor matrices. This is due to the fact that both the crossbar switch and the transfluxor matrix are controlled on the coincidence principle, see, for example, U.S. Patent No. 2,614,176. However, as compared to the electro-mechanically controlled crossbar switch, the transfluxor matrix firstly has the advantage that it may be switched much more rapidly and secondly has the advantage that it may be controlled by means of pulses. The latter fact is due to the transfluxor having a storing function. The consequence of the very high speed of switching of the transfluxor matrix is that the "one at a time" principle may be used even in large exchanges, resulting in a considerable saving in control equipment. The control by means of pulses, combined with the "one at a time" principle, makes it possible to pass one and the same control wire through the transfluxors of two or more rows or columns (or parts thereof) of different transfluxor matrices, resulting in a considerable simplification of the control equipment.

From the foregoing it appears that the arrangement must always be such that each transfluxor in an information channel receives current pulses switching it alternately from the condition B to the condition C, and conversely. With traffic in one direction, this may be effected by providing for the signal to consist of pulses of alternating polarities, for example pulses corresponding to the front and rear flanks of pulses of a telegraph signal or of pulses modulated in duration. If a pulse-code signal is to be transmitted, the pulses of this signal are required to have alternating polarities. With traffic in two directions, the two signals may be transmitted by means of series of pulses all having the same polarity, provided the arrangement is designed so that the pulses of one signal changes over the transfluxors from condition B to condition C and the pulses of the other signal changes over the transfluxors from condition C to condition B, the pulses of the two signals alternating each other. According to this principle, even more than two signals may be led simultaneously through the same transfluxors.

What is claimed is:

1. A telecommunication system of the type having a plurality of transmitters and a plurality of receivers, and in which information is transmitted between said transmitters and receivers in the form of pulses, said system comprising a plurality of transfluxors each having first and second control windings and first and second controlled windings, each of said transmitters being connected to each of said receivers by way of the first and second controlled windings of at least one of said transfluxors, control circuit means, and means connecting the first and second control windings of each of said transfluxors to said control circuit means, said control circuit means comprising means for simultaneously applying current pulses to selected pairs of said first and second conductors whereby said transfluxors may be selectively brought into open and closed states by coincidence.

2. A telecommunication system of the type having a plurality of transmitters and a plurality of receivers, and in which information is transmitted between said transmitters and receivers in the form of pulses, said system comprising a plurality of transfluxors arranged in a matrix of a plurality of rows and columns, each of said transfluxors having first and second control windings and first and second controlled windings, means interconnecting each of said transmitters with each of said receivers by way of the first and second controlled windings of at least one of said transfluxors, control circuit means, said first control windings of each of said transfluxors in each of said rows being connected together to said control circuit means and said second control windings of each of said transfluxors in each of said columns being connected together to said control circuit means, whereby said transfluxors may be selectively brought into open and closed states by coincidence.

3. The telecommunication system of claim 2, in which each of said transmitters comprises means for converting a signal by differentiation into a series of pulses of alternately opposite polarities, means applying said series of pulses to said first controlled winding of at least one of said transfluxors, and means connecting the second controlled winding of said at least one transfluxor to at least one of said receivers, said receiver comprising bistable trigger means for converting said series of pulses into the original said signal.

4. The telecommunication system of claim 2, in which each of said transmitters comprises means for converting an acoustic signal into a series of pulses modulated in duration, and means for converting said series of pulses by differentiation into a series of pulses of alternately opposite polarities, means applying said last-mentioned series of pulses to said first controlled winding of at least one of said transfluxors, and means connecting the second controlled winding of said at least one transfluxor to at least one of said receivers, said receiver comprising bistable trigger circuit means for converting said last-mentioned series of pulses into duration modulated pulses, and means demodulating said duration modulated pulses.

5. The telecommunication system of claim 2 arranged for telephone traffic in two directions and said information comprises a pair of acoustic signals, comprising means for converting the two acoustic signals to be transmitted by way of a signal path into two series of pulses modulated in duration, the pulses of said two series being located in alternate time intervals, whereby the pulses of the series of pulses have one flank fixed in time and one flank variable in time, means converting said modulated pulses by differentiation into a series of pulses of alternately opposite polarities, whereby the pulses of one polarity occur at fixed instants and the pulses of the other polarity occur at variable instants, and means transmitting only the pulses of said other polarity by way of the controlled windings of at least one of said transfluxors, said receivers comprising bistable trigger circuit means for reconverting the transmitted pulses into duration modulated pulses, and means for demodulating said duration modulated pulses.

6. The telecommunication system of claim 2, wherein said transmitter means comprise means for converting a signal into pulse code group form, the sequential pulses of which have opposite polarities, and means for applying said sequential pulses to the first controlled winding of at least one of said transfluxors.

7. A telecommunication system of the type having a plurality of transmitters and a plurality of receivers, and in which information is transmitted between said transmitters and receivers in the form of pulses, said system comprising a plurality of transfluxors each having a plurality of control windings and a plurality of controlled windings, means connecting each of said transmitters to each of said receivers by a signal path extending through the controlled windings of at least one of said transfluxors, control circuit means, and means connecting the control windings of said transfluxors to said control circuit means, said control circuit means comprising means for simultaneously applying current pulses to selected groups of said control windings whereby said transfluxors may be selectively brought into open and closed states by coincidence, said pulses being transmittable through the controlled windings of said transfluxors only in the closed state thereof.

8. The telecommunication system of claim 7, in which said transfluxors are arranged in a matrix of a plurality of rows and columns, means interconnecting a control winding of each transfluxor in a common row, and means interconnecting another control winding of each transfluxor in a common column.

9. The telecommunication system of claim 8, in which said transmitters comprise means for converting a signal into a series of pulses of alternately opposite polarities, and means applying said series of pulses to a control winding of at least one of said transfluxors.

References Cited in the file of this patent

UNITED STATES PATENTS

| | | |
|---|---|---|
| 2,418,127 | Labin | Apr. 1, 1947 |
| 2,691,154 | Rajchman | Oct. 5, 1954 |
| 2,734,182 | Rajchman | Feb. 7, 1956 |
| 2,734,184 | Rajchman | Feb. 7, 1956 |
| 2,776,419 | Rajchman | Jan. 1, 1957 |
| 2,794,072 | Oswald | May 28, 1957 |
| 2,803,812 | Rajchman et al. | Aug. 20, 1957 |
| 2,818,555 | Lo | Dec. 31, 1957 |
| 2,856,596 | Miller | Oct. 14, 1958 |
| 2,919,430 | Rajchman | Dec. 29, 1959 |
| 2,949,504 | Rubinoff | Oct. 16, 1960 |